(No Model.)

G. W. McGILL.
SAMPLE HOLDER OR FASTENER FOR SHOW OR OTHER CARDS.

No. 429,943. Patented June 10, 1890.

Witnesses.
Robert Crutt
Dennis Sumby

Inventor
George W. McGill
By
James L. Norris,
Atty.

UNITED STATES PATENT OFFICE.

GEORGE W. McGILL, OF NEW YORK, N. Y.

SAMPLE HOLDER OR FASTENER FOR SHOW AND OTHER CARDS.

SPECIFICATION forming part of Letters Patent No. 429,943, dated June 10, 1890.

Application filed December 26 1889. Serial No. 334,954. (No model.)

*To all whom it may concern:*

Be it known that I, GEORGE W. MCGILL, a citizen of the United States, residing at New York, (Riverdale,) in the county of New York and State of New York, have invented new and useful Improvements in Sample Holders or Fasteners for Show and other Cards, of which the following is a specification.

This invention has for its object to provide a novel, simple, durable, and efficient holder or fastener to be mounted on or attached to show-cards for exhibiting articles of merchandise, such as pencils, pen-holders, crayons, wire, cord, and other objects.

The invention consists in a holder or fastener for show-cards and other purposes, composed of a ring-loop extended into two prongs, which are held in parallel contiguity by the contractile force of the ring-loop.

The invention also consists in a holder or fastener for show-cards and other purposes, composed of a contractive ring-loop extended into two prongs, having the end portion of one extending beyond the end portion of the other and the two prongs held in parallel contiguity by the contractile force of the ring-loop in its tendency to close.

The invention finally consists in a holder or fastener for show-cards and other purposes, composed of a ring-loop formed integral with a collar which is extended into two prongs.

Figure 1:
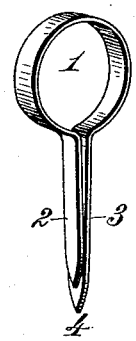
Figure 2:
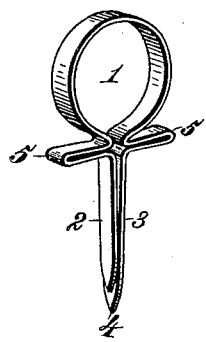
Figure 3:
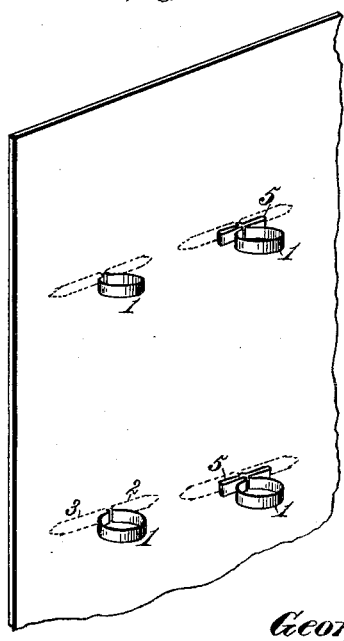

The invention is illustrated by the accompanying drawings, in which Figure 1 is a perspective view of a holder or fastener embodying my invention; Fig. 2, a similar view showing a modified construction; and Fig. 3 is a broken perspective view of a show-card with the two forms of holders or fasteners applied thereto.

In order to enable those skilled in the art to make and use my invention, I will now describe the method of making the holders or fasteners.

I take a narrow strip of sheet metal and fold it near the middle of its length into two members and hold these in contact with each other for a distance equal to the length of the two prongs in the complete device, leaving a loop-like head at the joined ends of the two members. This loop-like head I then expand from its inside into a circular or similar shaped ring-loop, giving it a contractile or closing force, and thus producing a holder or fastener such as shown in Fig. 1, in which the numeral 1 indicates the ring-loop, and 2 and 3 the two prongs, having an end portion 4 of one suitably extended beyond the end portion of the other. In a holder or fastener thus produced the ring-loop is extended into the two prongs, and the ring-loop possesses the peculiar characteristic that it constantly tends to close or contract in diameter, whereby the two prongs are held in close contact parallel to each other. This provides a holder or fastener in which the prongs are always in correct position to be pushed through a show-card without the necessity of using the fingers to press the prongs into contact, so that they can both be passed through the small perforation in the card, as is ordinarily practiced in this type of devices. The prongs, after pressing through the show-card or other object or support, are spread laterally in opposite directions to clasp the device in proper position, and the article to be exhibited is inserted through the ring-loop.

The holder is useful for mounting various articles on show-cards and the like for exhibiting various articles of merchandise, such as pencils, pen-holders, crayons, wires, or cords. The lateral spreading of the two prongs is materially facilitated by reason of one prong having its end portion extended beyond the end portion of the other, as at 4.

Prior to my invention a holder or fastener has been composed of a ring-loop extended into two prongs; but in the prior device the ring springs open or expands in diameter immediately after its completion, and hence the prongs are thrown apart and diverge from their point of junction with the ring-loops. This has been found exceedingly objectionable, and it arises from the fact that prior to my invention the device was formed by bending a strip of metal around a cylindrical mandrel and pressing the extremities of the strip toward each other and then withdrawing the mandrel. This results in imparting to the ring-loop a tendency to open, and consequently the prongs immediately spring apart.

The devices are sold as articles of manufacture to be subsequently applied to show-cards and the like for exhibiting goods, and hence my holders or fasteners are very desirable and useful, since they can be more rapidly and conveniently applied than prior devices of this kind.

In Fig. 2 I show the ring-loop 1 formed in a single piece with a collar 5, from which the two prongs 2 and 3 extend, so that the collar braces and strengthens the ring-loop and enables the show or other card to be clamped between the collar and the turned-down or clinched prongs. In this construction I also extend one end portion of a prong beyond the end portion of the other to facilitate bending down or clinching the prongs.

What I claim as my invention is—

1. A holder or fastener for show-cards and other purposes, composed of a ring-loop extended into two prongs which are held in parallel contiguity by the contractile force of the ring-loop, substantially as described.

2. A holder or fastener for show-cards and other purposes, composed of a ring-loop formed integral with a collar which is extended into two prongs, substantially as described.

In testimony whereof I have affixed my signature in presence of two witnesses.

GEORGE W. McGILL.

Witnesses:
THOS. B. KENT,
HENRY SCOTT.